United States Patent
Heidemann (10) Patent No.: US 11,747,584 B2
(45) Date of Patent: Sep. 5, 2023

(54) OPTICAL COMPONENT MOUNT

(71) Applicant: OPTOS PLC, Dunfermline (GB)

(72) Inventor: Rainer Heidemann, Dunfermline (GB)

(73) Assignee: OPTOS PLC, Dunfermline (GB)

( * ) Notice: Subject to any disclaimer, the term of this patent is extended or adjusted under 35 U.S.C. 154(b) by 92 days.

(21) Appl. No.: 17/196,796

(22) Filed: Mar. 9, 2021

(65) Prior Publication Data
US 2021/0286146 A1 Sep. 16, 2021

(30) Foreign Application Priority Data
Mar. 13, 2020 (EP) ..................... 20163029

(51) Int. Cl.
*G02B 7/00* (2021.01)
*G02B 7/02* (2021.01)
*G01J 3/02* (2006.01)

(52) U.S. Cl.
CPC ............ *G02B 7/008* (2013.01); *G01J 3/0237* (2013.01); *G02B 7/028* (2013.01)

(58) Field of Classification Search
CPC ... G02B 7/00; G02B 7/10; G02B 7/02; G02B 7/04; G02B 7/008; G02B 7/028; G02B 7/023; G02B 7/021; G02B 7/026; G02B 6/4244; G02B 6/4266; G02B 6/4286; G01J 3/02; G01J 3/10; G01J 3/28; G01J 3/14; G01J 3/42; G01J 3/0237; G01J 3/0208; G01J 3/0291; G01J 3/0202; G01J 3/0262; G01J 3/0256; G01J 3/0286
USPC ....... 359/820, 819, 808, 811, 703, 740, 566, 359/569; 356/326, 328
See application file for complete search history.

(56) References Cited

U.S. PATENT DOCUMENTS

| | | | |
|---|---|---|---|
| 5,210,650 A | 5/1993 | O'Brian et al. | |
| 5,313,333 A | 5/1994 | O'Brian et al. | |
| 6,538,736 B1 | 3/2003 | Palumbo | |
| 2005/0007586 A1* | 1/2005 | Bastue | G01J 3/18 356/328 |

(Continued)

FOREIGN PATENT DOCUMENTS

| | | |
|---|---|---|
| GB | 2117903 A | 10/1983 |
| JP | H06-075150 A | 3/1994 |

(Continued)

OTHER PUBLICATIONS

Extended European Search Report (EESR) dated Oct. 6, 2020 issued in European patent application 20 163 029.0 (7 pages).

(Continued)

*Primary Examiner* — Jie Lei
(74) *Attorney, Agent, or Firm* — Faegre Drinker Biddle & Reath; Victor P. Jonas (57) ABSTRACT

An apparatus for providing temperature-dependent movement of an optical element, the apparatus comprising: a moveable mount for the optical element; a mount moving component attached to the moveable mount; and a guide attached to the mount moving component and configured to guide a movement of the moveable mount. The apparatus is configured such that a difference in thermal contraction or thermal expansion between the mount moving component and the guide in response to a change in temperature of the apparatus causes the mount moving component to move the moveable mount relative to the guide.

10 Claims, 5 Drawing Sheets

(56) References Cited

U.S. PATENT DOCUMENTS

| | | |
|---|---|---|
| 2005/0232619 A1 | 10/2005 | Yamamoto |
| 2016/0291283 A1 | 10/2016 | Tagle |
| 2017/0227523 A1 | 8/2017 | Cafferty et al. |
| 2017/0276895 A1 | 9/2017 | Sakuma et al. |
| 2019/0033551 A1 | 1/2019 | Huang et al. |

FOREIGN PATENT DOCUMENTS

| | | |
|---|---|---|
| JP | 7-113974 | 5/1995 |
| JP | H10-325754 | 12/1998 |
| JP | 2003-515733 A | 5/2003 |
| JP | 2005-308779 A | 11/2005 |
| JP | 2016-92375 A | 5/2016 |
| JP | 2017-083667 A | 5/2017 |
| JP | 2017-083816 | 5/2017 |

OTHER PUBLICATIONS

Decision to Grant Patent dated Oct. 11, 2022 in Japanese Patent Application No. 2021-041255 (1 sheet); English-language translation attached (3 sheets).

Notice of Reasons for Refusal dated Jul. 26, 2022 in Japanese Patent Application No. 2021-041255 (3 sheets); English-language translation attached (5 sheets).

Office Action dated Mar. 22, 2022 in Chinese Patent Application No. 202110276345X (7 sheets); English-language Summary of Office Action Rejections (5 sheets).

\* cited by examiner

OPTICAL COMPONENT MOUNT

CROSS REFERENCE TO RELATED APPLICATION

This application claims the benefit of priority based on European Patent Application EP 20 163 029.0 filed Mar. 13, 2020, which is hereby incorporated by reference in its entirety as if set forth fully herein.

TECHNICAL FIELD

Example aspects herein generally relate to the field of optics and, more particularly, to mounts for mounting optical components such as lenses, mirrors, photodetectors and the like.

BACKGROUND

Figure 1A:
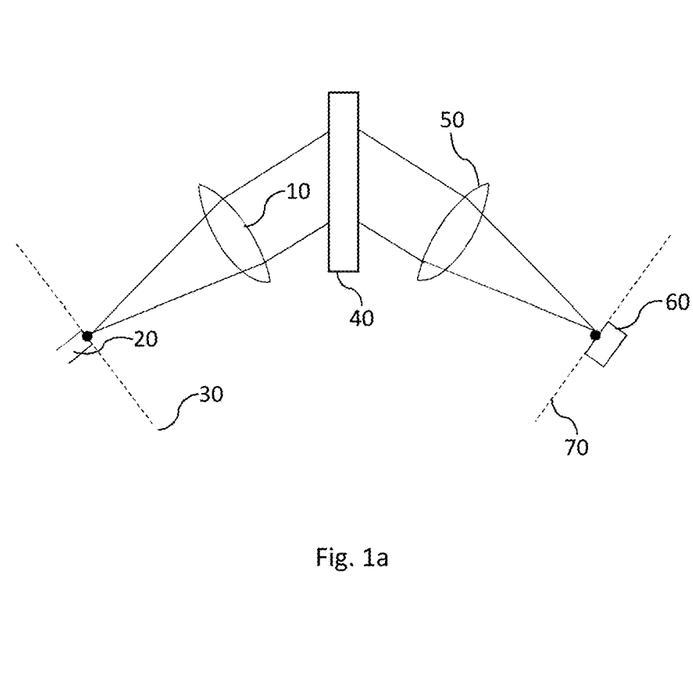
FIG. 1a is a schematic illustration of an arrangement of optical components in a conventional spectrometer.

Optical instruments typically comprise a number of optical components mounted on a frame or base. By way of an example, a spectrometer usually comprises, as illustrated schematically in FIG. 1a, a collimating lens 10 arranged to collimate light received from an optical fiber or other optical waveguide 20 located in a focal plane 30 of the collimating lens 10, a diffraction grating 40 arranged to receive the collimated light and provide dispersed light comprising spatially separated spectral components of the light, and a focusing lens 50 which is arranged to receive the dispersed light and focus the received dispersed light onto a spot on a light detector 60 located in a focal plane 70 of the focusing lens 40. In a conventional spectrometer, these optical components are usually mounted on a frame of the spectrometer, which is typically made of aluminium or another metal. Placing the end of the optical waveguide 20 precisely in the focal plane of the collimating lens 10 and the light detector 60 precisely in the focal plane of the focusing lens 50 minimises the size of the spot on the sensor and improves the performance of the spectrometer. The need for such precise placement of optical components arises not only in spectrometers but in many other optical instruments, in order to optimise the optical instrument's performance in processing light to enhance an image for viewing or recording, or analyse the light and determine one or more of its characteristic properties (e.g. spectral content or polarisation), for example.

SUMMARY

Figure 1B:
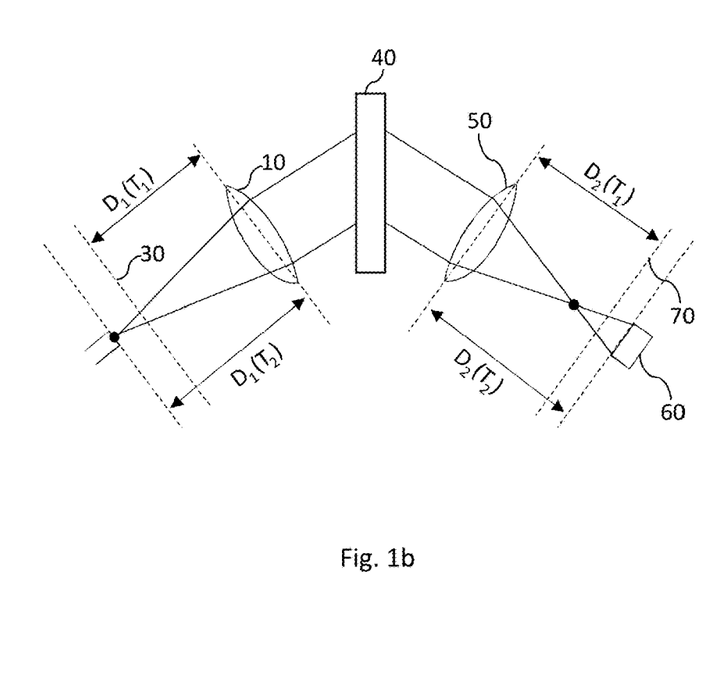
FIG. 1b is a schematic illustration of how the arrangement of the optical components in the conventional spectrometer of FIG. 1a changes in response to a temperature increase.

When the temperature of a conventional optical instrument changes (due to a change in ambient temperature of the optical instrument and/or heating or cooling of the optical instrument caused by operation of components thereof, for example), the frame of the optical instrument undergoes a thermal expansion or a thermal contraction, and the distances between the optical elements mounted on the instrument's frame consequently deviate from their optimal values. This can degrade the performance of the optical instrument. For example, in a conventional spectrometer of the kind described above, the deviation of the distance between the end of the input optical waveguide 20 and the collimating lens 10 (and/or the distance between the focusing lens 50 and the light detector 60) from its optimal value with changing temperature can cause the spot size to increase with the changing temperature and thus degrade the performance of the spectrometer. For example, as illustrated in FIG. 1b, a thermal expansion of the spectrometer frame that accompanies an increase in temperature of the frame from a time $T_1$ to time $T_2$ results in the distance between the optical waveguide 20 and the collimating lens 10 increasing from a distance $D_1(T_1)$ to a distance $D_1(T_2)$, while the distance between the focusing lens 50 and the light detector 60 increases from a distance $D_2(T_1)$ to a distance DATA resulting in an increase in the spot size. A conventional approach to athermalising a spectrometer or other optical instrument typically relies on using a material with a very low coefficient of thermal expansion for the frame of the instrument. However, materials having this property, such as Invar™ (FeNi36) or the like, are typically expensive, making an optical instrument athermalised in this way costly to produce.

In view of the above shortcomings of conventional approaches to athermalising optical instruments, the present inventor has devised, in accordance with at least some of the example embodiments herein, an apparatus for providing temperature-dependent movement of an optical element that can be used to mount the optical element in an optical instrument. The apparatus may be tuned to provide a temperature-dependent movement of the optical element that compensates for a thermally-induced relative movement of at least some of the other optical elements in the instrument that may be fixed to the frame of the optical instrument, for example, thereby preserving the performance of the optical instrument (for example, via a substantially constant spot size in the case of the conventional spectrometer discussed above) across a range of temperatures in which the optical instrument is to operate.

In more detail, there is provided, in accordance with a first example aspect herein, an apparatus for providing temperature-dependent movement of an optical element, the apparatus comprising a moveable mount for the optical element, a mount moving component attached to the moveable mount, and a guide attached to the mount moving component and configured to guide a movement of the moveable mount. The apparatus is configured such that a difference in thermal contraction or thermal expansion between the mount moving component and the guide in response to a change in temperature of the apparatus causes the mount moving component to move the moveable mount relative to the guide.

There is also provided, in accordance with a second example aspect herein, an optical instrument comprising a frame on which are mounted a plurality of optical elements and an apparatus according to the first example aspect set out above. An optical element of the plurality of optical elements is mounted on the moveable mount of the apparatus, and the mount moving component of the apparatus is configured to move the optical element mounted on the moveable mount with changing temperature of the optical instrument so as to compensate for a change in optical path distance on the frame between a first optical element and a second optical element of the other optical elements with the changing temperature.

There is also provided, in accordance with a third example aspect herein, an apparatus for providing temperature-dependent movement of an optical element, the apparatus comprising a base, a moveable mount for the optical element, and a mount moving component attached to the moveable mount and to the base, the mount moving component being configured to move the moveable mount relative to the base with changing temperature of the apparatus by thermal expansion or thermal contraction of the mount moving component.

There is also provided, in accordance with a fourth example aspect herein, an optical instrument comprising a frame on which are mounted a plurality of optical elements, and an apparatus for providing temperature-dependent movement of an optical element according to the third example aspect set out above, the apparatus being mounted on the frame via the base of the apparatus. An optical element of the plurality of optical elements is mounted on the moveable mount of the apparatus, and the mount moving component of the apparatus is configured to move the optical element mounted on the moveable mount relative to the frame with changing temperature of the optical instrument, by thermal expansion or thermal contraction of the mount moving component, so as to compensate for a change in optical path distance on the frame between a first optical element and a second optical element of the other optical elements with the changing temperature.

BRIEF DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

FIG. 5b is a schematic illustration of a spectrometer according to an example embodiment described herein, which comprises the apparatus of FIG. 5a.

DETAILED DESCRIPTION OF EXAMPLE EMBODIMENTS

Example embodiments herein will now be described in more detail with reference to the accompanying drawings.

First Example Embodiment

Figure 2:
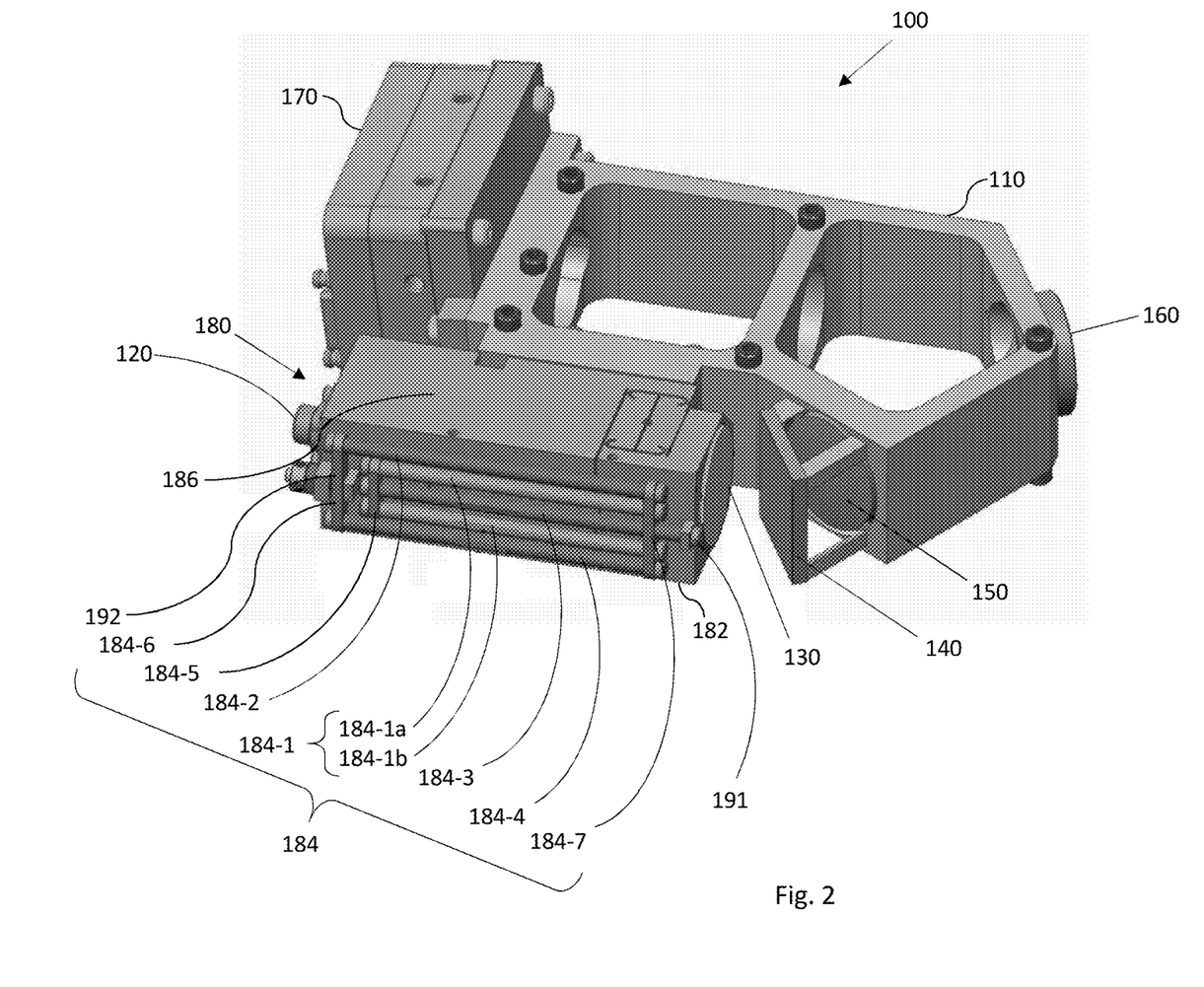
FIG. 2 illustrates a spectrometer according to a first example embodiment described herein.

FIG. 2 is a schematic illustration of an optical instrument in the example form of a spectrometer 100, in accordance with a first example embodiment.

The spectrometer 100 comprises a spectrometer frame (body) 110, on which are mounted a receptacle 120 for an optical waveguide (not shown), a collimating lens 130, a diffraction grating 140, a focusing lens 150, (an optional) mirror 160 and a light detector 170. The spectrometer 100 further comprises an apparatus 180 for providing temperature-dependent movement of the collimating lens 130. More particularly, the collimating lens 130 is mounted on a moveable mount of the apparatus 180, examples of which are described in more detail below. A mount moving component of the apparatus 180 is configured to move the moveable mount and the collimating lens 130 thereon in response to a change in temperature of the spectrometer 100 so as to compensate for a change in the optical path length between the focusing lens 150 and the light detector 170 by expansion of the frame 110 caused by the temperature change, and thus keep a size of the spot on the light detector 170 (e.g. a light-recording surface of the light-detector, such as a photodetector array) substantially independent of the temperature (i.e. to compensate for changes in a size of the spot with the changing temperature or, put another way, to prevent a size of the spot changing with the temperature).

It should be noted, however, that the apparatus 180 of the example embodiment may alternatively be arranged to provide temperature-dependent movement of the receptacle 120, the focusing lens 150 or the light detector 170. Furthermore, two or more of these optical components of the spectrometer 100 may be mounted on the moveable mounts of the respective apparatuses 180 of the example embodiment. The mount moving component of each of one or more apparatuses 180 included in the spectrometer 100 may be configured to move the respective optical element mounted on the respective moveable mount with changing temperature so as to keep a size of the spot on the light detector 170 substantially independent of the temperature.

More generally, the apparatus according to example embodiments herein may be arranged to provide a temperature-dependent movement of any optical component of the optical instrument that may compensate for a change in optical path distance between any other optical components of the optical instrument that occurs in response to a change in temperature of the optical instrument, and any aspects of the optical instrument's performance that may be degraded as a result of this change in optical path distance. The example embodiments of an apparatus for providing temperature-dependent movement of an optical element described herein may accordingly be used not only in spectrometers but in a variety of other optical instruments, such as laser sources, fibre coupled systems and any other devices requiring accurate control of collimation and/or focussing of optical beams.

The apparatus 180 comprises a moveable mount 182 for the collimating lens 130, a mount moving component 184-1 comprising a first rod 184-1a and a second rod 184-1b, and a guide 186 which is attached to the moveable mount 182 and to the mount moving component 184-1 and configured to guide a movement of the moveable mount 182. The guide 186 may, as in the present example embodiment, serve as a support for supporting both the mount moving component 184-1 and the moveable mount 182. The apparatus 180 is configured such that a difference in thermal contraction or thermal expansion between the mount moving component 184-1 and the guide 186 in response to a change in ambient temperature causes the mount moving component 184-1 to move the moveable mount 182 relative to the guide 186. In other words, in response to a change in temperature of the apparatus 180 which leads to a warming (or cooling, as the case may be) of the apparatus 180 itself, the difference between the resultant thermal expansion (or thermal contraction, as the case may be) of the mount moving component 184-1 and the resultant thermal expansion (or thermal contraction, as the case may be) of the guide 186, causes the mount moving component to move the moveable mount 182 relative to the guide 186. Thus, the different amounts by which the lengths of the mount moving component 184-1 and the guide 186 in the direction of the optical path through the apparatus 180 change as a result of the temperature change, cause the moveable mount 182 to move relative to the guide 186.

The mount moving component 184-1 may be formed of a first material (or a composition of two or more materials) which has a greater coefficient of thermal expansion than a second (different) material (or different composition of two or more materials) of which the guide 186 is formed. By way of an example, in the present example embodiment, the first material is a plastic (specifically, polyether ether ketone (PEEK), although another type of plastic could alternatively be used), and the second material is a metal (specifically, aluminium, although another metal or a metal alloy (e.g Invar™) could alternatively be used). However, in other example embodiments, the mount moving component 184-1 may be formed of a material (or a composition of two or more materials) which has a smaller coefficient of thermal expansion than the material (or composition of two or more materials) of which the guide 186 is formed.

The moveable mount 182 and the guide 186 of the present example embodiment will now be described in more detail with reference to FIG. 3.

Figure 3:
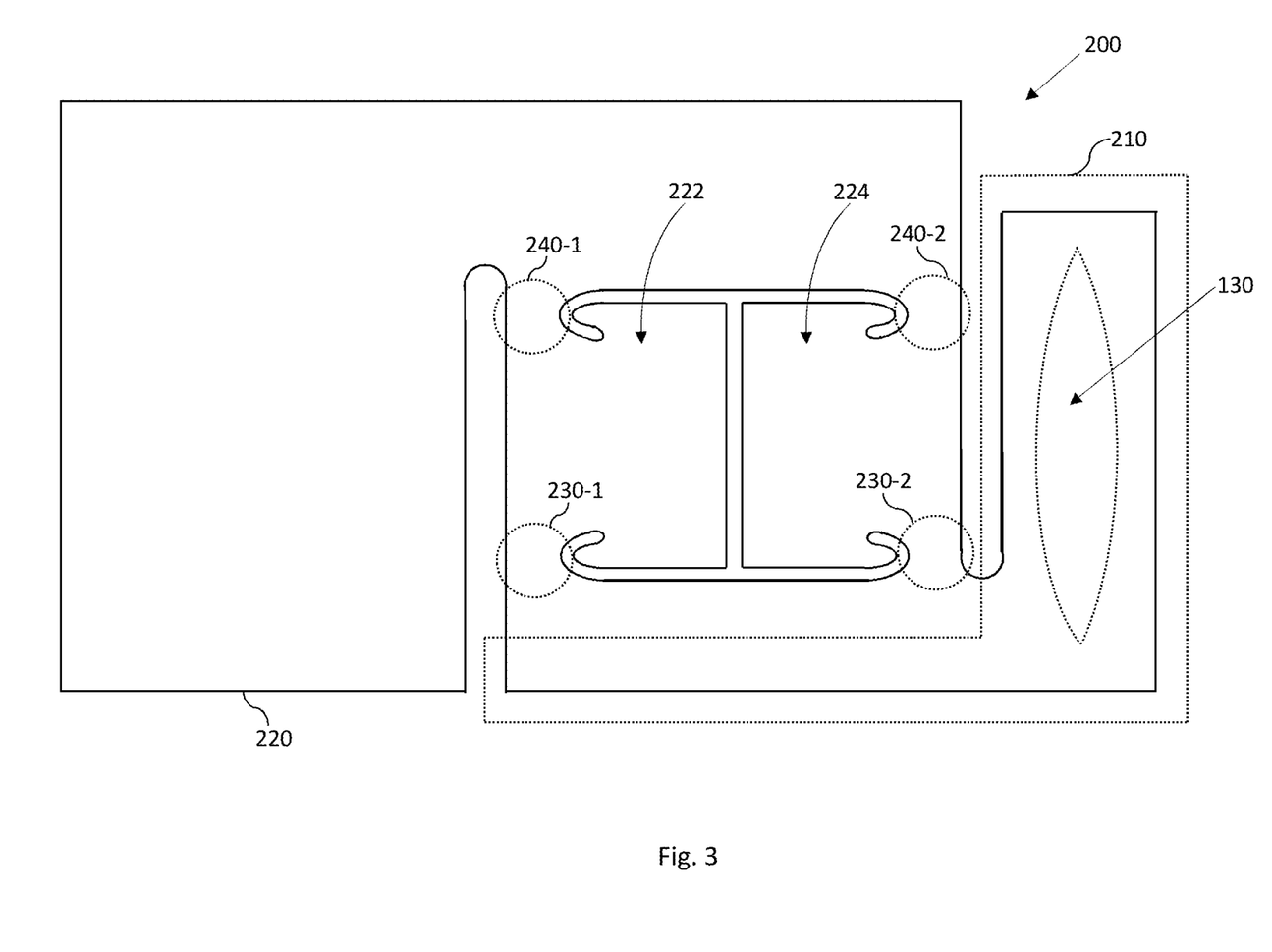
FIG. 3 is a schematic plan view of a flexure mount in the spectrometer according to the first example embodiment described herein.

The moveable mount 182 may, as illustrated by way of example in FIG. 3, form a first portion 210 of a flexure mount 200. The guide 186 may form a second portion 220 of the flexure mount 200, the first portion 210 of the flexure mount 200 being joined to the second portion 220 of the flexure mount 200 by deformable portions 230-1 and 230-2 of the flexure mount 200. The flexure mount 200 may, as in the present example embodiment, be a single-piece item made by machining a piece of aluminium. Flexure mounts provide an advantage of allowing the moveable mount 182 to be moved with little or no play or hysteresis, thus allowing the collimating lens 130 to be moved precisely and consistently. The mount moving component 184-1 is configured to move the first portion 210 of the flexure mount 200 relative to the second portion 220 of the flexure mount 200 by the mount moving component 184-1 undergoing a greater thermal contraction or thermal expansion than the guide 186 for a given change in the ambient temperature of the apparatus 180. In other words, the greater thermal contraction or thermal expansion of the mount moving component 184-1 in response to a change in the temperature causes a deformation of the deformable portions of the flexure mount 200 and thereby causes the first portion 210 of the flexure mount 200 to move relative to the second portion 220 of the flexure mount 200. In example embodiments like the present example embodiment, where the first material has a much greater coefficient of thermal expansion than the second material, the thermal expansion/contraction of the guide 186 may be negligible in comparison with the thermal expansion/contraction of the mount moving component 184-1.

As noted above, in other example embodiments, the mount moving component 184-1 may be formed of a material (or a composition of two or more materials) which has a smaller coefficient of thermal expansion than the material (or composition of two or more materials) of which the guide 186 is formed. In these example embodiments too, the difference in the thermal contraction or thermal expansion of the mount moving component 184-1 and the guide 186 in response to a change in the temperature of the apparatus 180 would cause a deformation of the deformable portions of the flexure mount 200 and thereby cause the first portion 210 of the flexure mount 200 to move relative to the second portion 220 of the flexure mount 200. In these alternative embodiments, the first material may have a much smaller coefficient of thermal expansion than the second material so that the thermal expansion/contraction of the mount moving component 184-1 may be negligible in comparison with the thermal expansion/contraction of the guide 186. In these cases, the mount moving component 184-1 may cause the guide 186 to at least partially thermally expand inward from its ends (rather than to only increase in length) and compress the flexure mount 200, and thus move the moveable mount 182 closer to the guide 186, and the guide 186 may be attached to the frame 110 of the spectrometer 100 in the vicinity of the moveable mount 182 so to maximise the movement of the moveable mount 182 relative to the frame 110.

The flexure mount 200 may, as in the present example embodiment, be configured to allow movement of the first portion 210 of the flexure mount 200 relative to the second portion 220 of the flexure mount 200 without rotating the first portion 210 relative to the second portion 220. In other words, the flexure mount 200 may be configured to allow only a translation of the first portion 210 of the flexure mount 200 relative to the second portion 220 of the flexure mount 200. In the present example embodiment, this is achieved by configuring the second portion 220 of the flexure mount 200 to have a first arm portion 222 and a second arm portion 224, each of the first arm portion 222 and the second arm portion 224 being joined to a remainder of the second portion 220 via respective deformable portions, 240-1 and 240-2, of the second portion 220 such that the first arm portion 222 is rotatable about the deformable portion 240-1 by deformation of the deformable portion 240-1, and such that the second arm portion 224 is rotatable about the deformable portion 240-2 by deformation of the deformable portion 240-2. Each of the first arm portion 222 and the second arm portion 224 is joined to the first portion 210 of the flexure mount 200 via a respective one of the second deformable portions 230-1 and 230-2 of the second portion 220 such that each of the first arm portion 222 and the second arm portion 224 is further rotatable about the respective one of the second deformable portions 230-1 and 230-2 by deformation of the respective one of the second deformable portions 230-1 and 230-2. The length of the first arm portion 222 between the deformable portion 240-1 and the second deformable portion 230-1 is equal to a length of the second arm portion 224 between the deformable portion 240-2 and the second deformable portion 230-2, such that the deformable portions 240-1 and 240-2, and the second deformable portions 230-1 and 230-2, remain in a parallelogram arrangement as the first portion 210 of the flexure mount 200 moves relative to the second portion 220 of the flexure mount 200 by thermal contraction or thermal expansion of the mount moving component 184-1.

It should be noted, however, that although the flexure mount 200 of the present example embodiment is configured to allow movement of the first portion 210 relative to the second portion 220 along the optical axis of the collimating lens 130 and without rotating the first portion 210 relative to the second portion 220, an alternative form of flexure mount may be used to mount an optical component of another optical instrument, wherein a predetermined rotation of the optical component along one or more axes of rotation, for example, with changing instrument temperature may be required to compensate for a performance degradation that would otherwise occur with the changing temperature.

Referring again to FIG. 2, the mount moving component 184-1 comprises, as noted above, a first rod 184-1*a* of the first material (PEEK in this example embodiment), wherein a first end of at least a portion of the first rod 184-1*a* is connected to the first portion 210 of the flexure mount 220, and a second end of the at least a portion of the first rod 184-1a is connected to the second portion 220 of the flexure mount 200 such that a thermal expansion of the first rod 184-1a causes the first portion 210 of the flexure mount 200 and the second portion 220 of the flexure mount 200 to move towards each other. The mount moving component 184-1 may, as in the present example embodiment, have a second rod 184-1b of the first material which is connected to the flexure mount 200 in the same way as the first rod 184-1a or, more generally, one or more such rods. Although the rods 184-1a and 184-1b are illustrated in FIG. 2 to have a uniform, circular cross-section, the cross-section of the rod(s) of the first material need not be uniform along the length of the rod(s), and need not be circular. The rod(s) may furthermore comprise any material having a thermal expansion coefficient that is sufficient different from the thermal expansion coefficient of the second material, so as to provide a movement of the collimating lens 130 which matches the movement of one or more of the other optical elements caused by thermal expansion/contraction of the frame 110, in order to reduce or preferably minimise a change in the size of the spot on the light detector 170 with changing temperature, at least over a temperature range over which the spectrometer is to operate (e.g. 0 to 50° C.).

In the example of FIG. 2, the mount moving component 184-1 forms part of a movement mechanism 184, wherein the first ends of the at least a portion of the rods 184-1a and 184-1b are connected to the first portion 210 of the flexure mount 220 via a first connector, and the second ends of the at least a portion of the rods 184-1a and 184-1b are connected to the second portion 220 of the flexure mount 200 via a second connector such that a thermal expansion of the rods 184-1a and 184-1b causes the first portion 210 of the flexure mount 200 and the second portion 220 of the flexure mount 200 to move towards each other. The first connector may, as in the present example embodiment, comprise a rod 184-3 made of a material with a low thermal expansion coefficient (e.g. Invar™), which is connected to the rods 184-1a and 184-1b by a first coupling piece 184-5 and which passes through an opening in a second coupling piece 184-7. The second connector may, as in the present example embodiment, comprise the second coupling piece 184-7, and two further rods 184-2 and 184-4 also made of Invar™ or other material with a low thermal expansion coefficient, which are attached to the second coupling piece 184-7 and to the second portion 220 of the flexure mount 200 via a third coupling piece 184-6, as illustrated in FIG. 2. The material of the coupling pieces 184-5 to 184-7 is not limited, and may comprise aluminium or steel, for example.

The arrangement of rods 184-2, 184-3 and 184-4, and coupling pieces 184-5 to 184-7 shown in FIG. 2 functions to reverse movement provided by the expansion of the rods 184-1a and 184-1b with increasing temperature of the apparatus 180, so that this expansion causes the first portion 210 and the second portion 220 of the flexure mount 200 to move towards each other, thus causing the collimating lens 130 to move closer to the receptacle 120 for an optical waveguide in order to at least partially compensate for an increase in the optical path distance between the focusing lens 150 and the light detector 170. It should be noted that the movement mechanism 184 may be modified to have a single one of the rods 184-1a and 184-1b, and/or a single one of the rods 184-2 and 184-4, although eh symmetrical arrangement illustrated in FIG. 2 is preferred. It will also be understood that such movement-reversing mechanical arrangements need not be employed, and that one or more of the rods of the first material whose thermal expansion or contraction is to cause the relative movement of the first and second portions of the flexure mount 200 may have ends thereof directly attached to the respective first and second portions of the flexure mount 200 so that a thermal expansion of the rod(s) causes the first portion 210 of the flexure mount 200 to move away from the second portion 220 of the flexure mount 200. Other types of mechanism for coupling the rod(s) of the first material whose thermal expansion or contraction is to cause the relative movement of the first and second portions of the flexure mount 200 so as to achieve the required relative movement of the first and second portions (210 and 220) of the flexure mount 200, which will be well-known to those versed in the art, may be employed in other example embodiments.

Second Example Embodiment

Although the moveable mount 182 and the guide 186 are provided as portions of a flexure mount 200 in the first example embodiment, these components of the apparatus for providing temperature-dependent movement of an optical element according to an embodiment may be implemented in other forms. For example, the moveable mount may be slidably engaged within the guide to slide relative to the guide when moved relative to the guide by the mount moving component. By way of an example of such an alternative arrangement, the guide may be provided in the form of a groove in the frame of the spectrometer or other optical instrument, and the moveable mount may include a guiding portion configured to slidably engage the groove so as to guide the movement of the moveable mount along a length of the groove.

Figure 4:
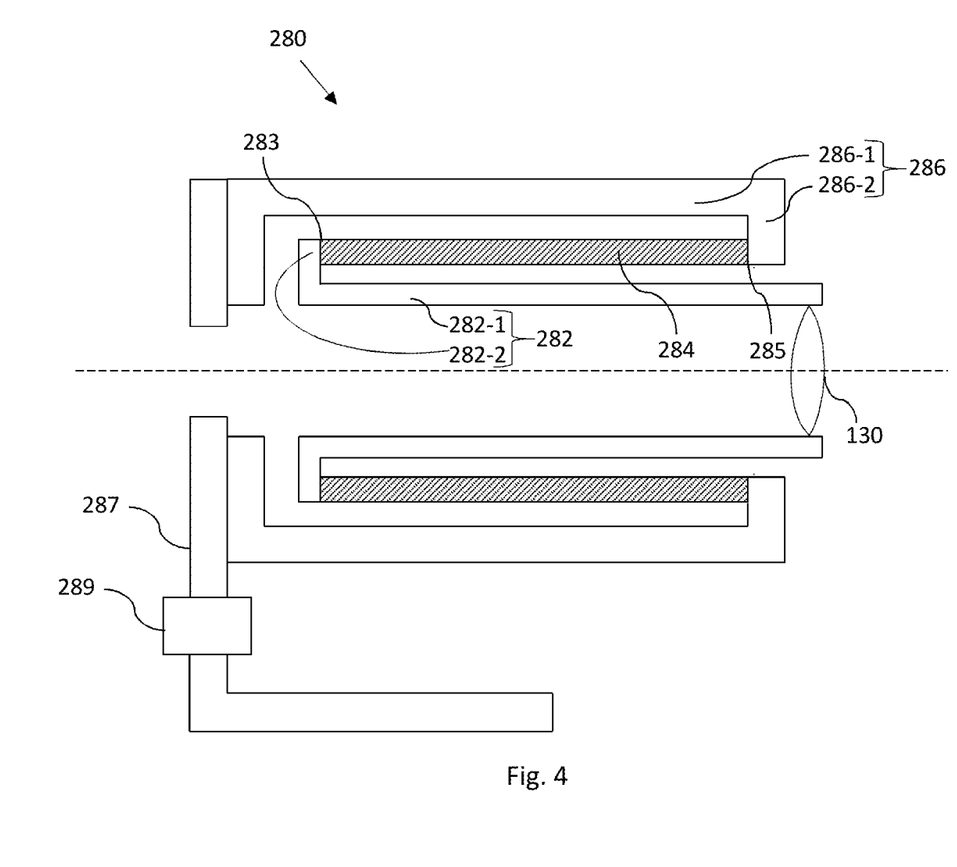
FIG. 4 is a cross-sectional view of an apparatus for providing temperature-dependent movement of an optical element according to a second example embodiment described herein.

FIG. 4 is a schematic illustration of a cross-section of an apparatus 280 for providing temperature-dependent movement of an optical element according to a second example embodiment. In the present example embodiment, the moveable mount 282 comprises a first tubular portion 282-1 and the guide 286 comprises a second tubular portion 286-1, wherein the first tubular portion 282-1 extends inside the second tubular portion 286-1. Although the first tubular portion 282-1 and the second tubular portion 286-1 are cylindrical in the present example embodiment, tubular parts having non-circular cross sections may alternatively be used.

As shown in FIG. 4, the first tubular portion 282-1 of the moveable mount 282 is configured to hold the collimating lens 130 but may alternatively hold any other optical element. Although the collimating lens 130 is mounted in an end part of the first tubular portion 282-1 of the moveable mount 282, it will be appreciated that the collimating lens 130 may alternatively be mounted within any other part of the first tubular portion 282-1.

The apparatus 280 comprises a base 287 which is attachable to the frame of the optical instrument by a screw or any other suitable attachment means, and preferably includes an adjustment mechanism 289 for adjusting the positioning of the guide 286 relative to the frame, to allow for proper alignment of the collimating lens 130 mounted within the first tubular portion 286-1 with one or more other optical elements of the optical instrument.

In the present example embodiment, the mount moving component comprises a piece 284 of a first material (or a first combination of different materials) having a first end connected to the first tubular portion 282-1 via a flange portion 282-2 of the moveable mount 282, and a second end connected to the second tubular portion 286-1 via a flange portion 286-2 of the guide 286. The first tubular portion 282-1 and the second tubular portion 286-1 are both formed of a second material (or a second combination of different materials) which may, as in the present example embodiment, have a coefficient of thermal expansion which is lower than the coefficient of thermal expansion of the first material/combination. It is noted that the first tubular portion 282-1 and the second tubular portion 286-1 need not be formed of the same material.

By way of an example, the first material may, as in the present example embodiment, be a plastic such as PEEK, and the second material may be any material having a lower coefficient of thermal expansion than the first material, preferably a metal such as aluminium or a metal alloy such as Invar™ having a much lower coefficient of thermal expansion than the first material. This choice of materials in the present example embodiment results in the thermal expansion/contraction of the piece 284 being much greater than the thermal expansion/contraction of the first tubular portion 282-1 and the second tubular portion 286-1 in response to a change in temperature of the apparatus 280. As a consequence, when the temperature increases, for example, the length of the piece 284 along the axis illustrated in FIG. 4 increases owing to the thermal expansion of the first material, thereby moving the first tubular portion 282-1 (and therefore the collimating lens 130 mounted therein) relative to the second tubular portion 286-1, specifically to the left in FIG. 4.

It should be noted that, as with the first example embodiment, there is no requirement for the coefficient of thermal expansion of the mount moving component to be much larger or much smaller than the coefficient of thermal expansion of the guide, and any difference between these two coefficients, and/or difference in the lengths of the mount moving component and the guide along the movement direction of the moveable mount, which results in a difference in the thermal expansion or contraction between the mount moving component and the guide in said direction when the temperature changes, may suffice.

The shape of the piece 284 is not limited, and the piece 284 may, for example, be tubular (e.g. cylindrical) and preferably be sufficiently rigid to support the first tubular portion 282-1 within the second tubular portion 286-1.

In a variant of the second example embodiment, the choice of materials for the tubular portions 182-1 and 186-1 on the one hand, and the piece 284 on the other, may be reversed so that the thermal expansion of the piece 284 in response to an increase in the temperature is much smaller than the thermal expansion of the tubular portions 182-1 and 186-1. This would result in a reversal of the direction of movement of the collimating lens 130 in response to an increase in the apparatus temperature, as compared to the second example embodiment, with the expansion of the tubular portions 182-1 and 186-1 with increasing temperature moving the collimating lens 130 to the right in FIG. 4.

In summary, there has been described, in accordance with the embodiments and their variants set out above, an apparatus 180 and 280 for providing temperature-dependent movement of an optical element 130, the apparatus comprising a moveable mount 182 and 282 for the optical element 130, a guide 186 and 286 configured to guide a movement of the moveable mount, and a mount moving component 184-1 having a first end attached to the moveable mount at a first attachment position 191 and 283 on the moveable mount, and a second end attached to the guide at a second attachment position 192 and 285 on the guide. The apparatus is configured such that a difference in thermal contraction or thermal expansion between the mount moving component and the guide in response to a change in temperature of the apparatus causes the mount moving component to move the moveable mount relative to the guide. Furthermore, the mount moving component is attached to the moveable mount such that a change in distance between the first attachment position and the second attachment position in response to the change in temperature of the apparatus is independent of the thermal contraction or thermal expansion of the guide in response to the change in temperature of the apparatus. Additionally or alternatively, the mount moving component is attached to the moveable mount such that a change in distance between the optical element when mounted on the movable mount and the second attachment position on the guide in response to the change in temperature of the apparatus is independent of the thermal contraction or thermal expansion of the guide in response to the change in temperature of the apparatus.

Third Example Embodiment

The structure of the variant of the second example embodiment described above may be simplified by dispensing with the piece 284 and the first tubular portion 282-1, and mounting the collimating lens 130 at an opposite end of the second tubular portion 286-1 to an end of the second tubular portion 286-1 at which the second tubular portion 286-1 is fixed to the optical instrument.

Figure 5A:
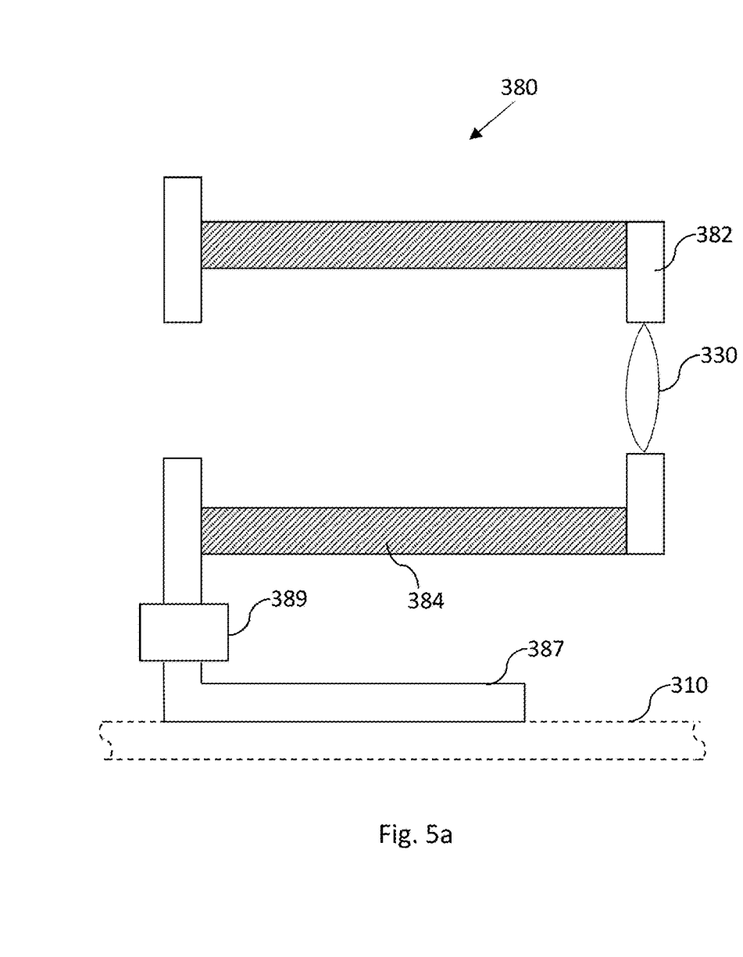
FIG. 5a is a cross-sectional view of an apparatus for providing temperature-dependent movement of an optical element according to a third example embodiment described herein.

An example of such a simplified apparatus, in accordance with a third example embodiment herein, is illustrated schematically (in cross-sectional view) in FIG. 5a. The apparatus 380 for providing temperature-dependent movement of an optical element according to the third example embodiment comprises a moveable mount 382 for the optical element 330, and a mount moving component 384 which is attached to the moveable mount 382 and attachable to a frame 310 of an optical instrument. The mount moving component 384 in the example pf FIG. 5a takes the form or a cylindrical piece of a material such as a plastic (preferably PEEK). The cross-section of the mount moving component 384 is not limited to an annulus, and may take another form. The mount moving component 384 is supported by a base 387, which is attachable to the frame 310 of the optical instrument by a screw or any other suitable attachment means, the base 387 preferably including an adjustment mechanism 389 for adjusting the positioning of the mount moving component 384 relative to the frame 310, to allow for proper alignment of the optical component 330 mounted within the moveable mount 382 with one or more other optical elements of the optical instrument. The mount moving component 384 is configured not only to move the moveable mount 382 but also to support it and guide its movement as the temperature of the apparatus 380 varies.

The apparatus 380 may be used to provide a temperature-dependent movement of an optical element in many kinds of optical instrument, in order to athermalize the optical instrument as described above. By way of an example, the installation of the apparatus 380 in a spectrometer 300 is illustrated schematically in FIG. 5b. The spectrometer 380 has a similar arrangement of optical components as the conventional spectrometer of FIG. 1a, and comprises a spectrometer frame (body) 310, on which are mounted a receptacle 320 for an optical waveguide (not shown), a collimating lens 330, a diffraction grating 340, a focusing lens 350, and a light detector 370. The spectrometer 300 further comprises the apparatus 380 for providing temperature-dependent movement of the collimating lens 330, as described above with reference to FIG. 5a. The mount moving component 384 of the apparatus 380 is configured to move the moveable mount 382 and the collimating lens 330 thereon in response to a change in temperature of the spectrometer 300 so as to compensate for a change in the optical path length between the focusing lens 350 and the light detector 370 by expansion of the frame 310 caused by the temperature change, and thus keep a size of the spot on the light detector 370 (e.g. a light-recording surface of the light-detector, such as a photodetector array) substantially independent of the temperature (i.e. to compensate for changes in a size of the spot with the changing temperature or, put another way, to prevent a size of the spot changing with the temperature).

Figure 5B:
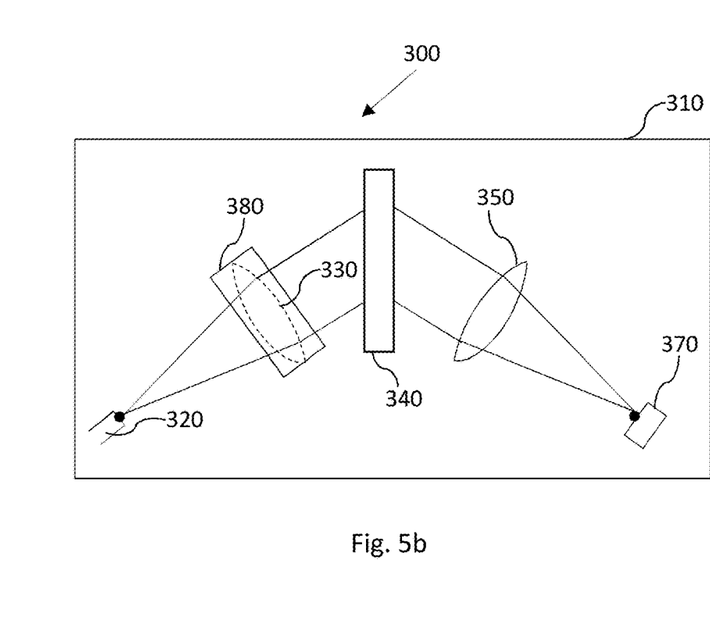

It should be noted, however, that the apparatus 380 of the third example embodiment may alternatively be arranged to provide temperature-dependent movement of the receptacle 320, the focusing lens 350 or the light detector 370. Furthermore, two or more of these optical components of the spectrometer 300 may be mounted on the moveable mounts 382 of the respective apparatuses 380. The mount moving component 384 of each of one or more apparatuses 380 included in the spectrometer 300 may be configured to move the respective optical element mounted on the respective moveable mount 382 with changing temperature so as to keep a size of the spot on the light detector 370 substantially independent of the temperature.

In summary, an apparatus 380 for providing temperature-dependent movement of an optical element (e.g. 330) according to the third example embodiment comprises a base 387, a moveable mount 382 for the optical element, and a mount moving component 384 attached to the moveable mount 382 and to the base 387, the mount moving component 384 being configured to move the moveable mount 382 relative to the base 387 with changing temperature of the apparatus 380 by thermal expansion or thermal contraction of the mount moving component 384.

The optical instrument 300 generally comprise a frame 310 on which are mounted a plurality of optical elements, and at least one apparatus 380 as summarised above. In the optical instrument 300, an optical element of the plurality of optical elements is mounted on the moveable mount 382 of the apparatus 380, and the mount moving component 384 of the apparatus 380 is configured to move the optical element 330 mounted on the moveable mount 382 relative to the frame 310 with changing temperature of the optical instrument 300, by thermal expansion or thermal contraction of the mount moving component 384, so as to compensate for a change in optical path distance on the frame 310 between a first optical element and a second optical element of the other optical elements with the changing temperature.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Having now described some illustrative embodiments and embodiments, it is apparent that the foregoing is illustrative and not limiting, having been presented by way of example.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The invention claimed is:

1. An optical instrument comprising:
   a frame on which are mounted a plurality of optical elements; and
   an apparatus for providing temperature-dependent movement of at least one of the optical elements, the apparatus comprising:
      a moveable mount for the at least one optical element;
      a mount moving component attached to the moveable mount; and
      a guide attached to the mount moving component and configured to guide a movement of the moveable mount,
      wherein the mount moving component has a first end attached to the moveable mount at a first attachment position on the moveable mount, and a second end attached to the guide at a second attachment position on the guide,
   wherein the apparatus is configured such that a difference in thermal contraction or thermal expansion between the mount moving component and the guide in response to a change in temperature of the apparatus causes the mount moving component to move the moveable mount relative to the guide,
   wherein the at least one optical element is mounted on the moveable mount of the apparatus, and wherein the mount moving component is attached to the moveable mount such that a change in distance between the at least one optical element when mounted on the moveable mount and the second attachment position on the guide in response to the change in temperature of the apparatus is independent of the thermal contraction or thermal expansion of the guide in response to the change in temperature of the apparatus.

2. The optical instrument according to claim 1, wherein the optical instrument is a spectrometer comprising a spectrometer frame on which are mounted, as the plurality of optical elements:
a receptacle for an optical waveguide;
a collimating lens;
a diffraction grating;
a focusing lens; and
a light detector, wherein
an optical element being one of the receptacle, the collimating lens, the focusing lens and the light detector is mounted on the moveable mount of the apparatus,
in use of the spectrometer, the collimating lens is arranged to collimate light from the optical waveguide, the diffraction grating is arranged to receive the collimated light and provide dispersed light comprising spatially separated spectral components of the light, and the focusing lens is arranged to receive the dispersed light and focus the received dispersed light onto a spot on the light detector, and
the mount moving component of the apparatus is configured to move the optical element mounted on the moveable mount with the change in temperature so as to keep a size of the spot substantially independent of the temperature.

3. The optical instrument according to claim 1, wherein the moveable mount forms a first portion of a flexure mount and the guide forms a second portion of the flexure mount, and wherein the apparatus is configured such that the difference in thermal contraction or thermal expansion between the mount moving component and the guide in response to the change in temperature of the apparatus causes the mount moving component to move the first portion of the flexure mount relative to the second portion of the flexure mount.

4. The optical instrument according to claim 3, wherein the flexure mount is configured to allow movement of the first portion of the flexure mount relative to the second portion of the flexure mount without rotating the first portion of the flexure mount relative to the second portion of the flexure mount.

5. The optical instrument according to claim 4, wherein the second portion of the flexure mount comprises a first arm portion and a second arm portion, each of the first arm portion and the second arm portion being joined to a remainder of the second portion via respective first deformable portions of the second portion such that each of the first arm portion and the second arm portion is rotatable about respective ones of the first deformable portions by deformation of the respective one of the first deformable portions,
each of the first arm portion and the second arm portion is joined to the first portion of the flexure mount via a respective one of second deformable portions of the second portion such that each of the first arm portion and the second arm portion is further rotatable about respective ones of the second deformable portions by deformation of the respective ones of the second deformable portions, and
a length of the first arm portion between a respective one of the first deformable portions associated with the first arm portion and a respective one of the second deformable portions associated with the first arm portion is equal to a length of the second arm portion between another respective one of the first deformable portions associated with the second arm portion and another respective one of the second deformable portions associated with the second arm portion, such that the first and second deformable portions remain in a parallelogram arrangement as the first portion of the flexure mount moves relative to the second portion of the flexure mount.

6. The optical instrument according to claim 3, wherein the mount moving component comprises a first rod, and wherein a first end of at least a portion of the first rod is connected to the first portion of the flexure mount and a second end of the at least a portion of the first rod is connected to the second portion of the flexure mount such that a thermal expansion of the first rod causes the first portion of the flexure mount and the second portion of the flexure mount to move away from or towards each other.

7. The optical instrument according to claim 6, wherein the first end of the at least a portion of the first rod is connected to the first portion of the flexure mount via a first connector, and the second end of the at least a portion of the first rod is connected to the second portion of the flexure mount via a second connector such that a thermal expansion of the first rod causes the first portion of the flexure mount and the second portion of the flexure mount to move towards each other.

8. The optical instrument according to claim 1, wherein the mount moving component is formed of a first material having a first coefficient of thermal expansion, and the guide is formed of a second material having a second coefficient of thermal expansion which is smaller than the first coefficient of thermal expansion.

9. The optical instrument according to claim 8, wherein the first material is a plastic and the second material is one of a metal or a metal alloy.

10. The optical instrument according to claim 9, wherein the first material is polyether ether ketone.

* * * * *